(12) United States Patent
Frison

(10) Patent No.: US 10,970,241 B1
(45) Date of Patent: Apr. 6, 2021

(54) CONVERTER SYSTEM AND COMPUTER-IMPLEMENTED METHOD

(71) Applicant: SAP SE, Walldorf (DE)

(72) Inventor: Giancarlo Frison, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/687,951

(22) Filed: Nov. 19, 2019

(30) Foreign Application Priority Data

Sep. 26, 2019 (EP) ..................................... 19199845

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ........ G06F 13/20; H04N 19/91; H04N 19/13; H04N 19/176
USPC .......................................................... 710/52
See application file for complete search history.

(56) References Cited

U.S. PATENT DOCUMENTS

| | | | | |
|---|---|---|---|---|
| 5,535,305 | A * | 7/1996 | Acero | G10L 15/144 704/256 |
| 6,253,165 | B1 * | 6/2001 | Malvar | G10L 19/0212 703/2 |
| 2003/0225605 | A1 * | 12/2003 | Yokota | G06Q 10/063118 705/7.17 |
| 2005/0256685 | A1 * | 11/2005 | Goodman | G06N 20/00 703/2 |
| 2008/0103859 | A1 * | 5/2008 | Yokota | G06Q 10/0635 705/7.28 |
| 2012/0197877 | A1 * | 8/2012 | Tunkelang | G06F 16/3331 707/723 |

(Continued)

*Primary Examiner* — Titus Wong
(74) *Attorney, Agent, or Firm* — Buckley, Maschoff & Talwalkar LLC

(57) ABSTRACT

A converter system for multi-component systems, comprising a multi-component system adjustment module, includes: an input/output unit, an adjustment unit configured to adjust at least one primary component of a primary multi-component system for each of the at least one primary component given as a probability distribution, a certainty evaluation unit configured to evaluate a certainty parameter of the primary multi-component system, and compare the certainty parameter with a certainty threshold, and a prompt selection unit configured to, if the certainty parameter of the primary multi-component system does not meet the certainty threshold, select a further primary component prompt of the plurality of primary component prompts and instructing the multi-component system adjustment module to perform the above steps on the basis of the further primary component prompt; wherein the converter system further comprises a multi-component system converter module, comprising: a converter unit configured to generate a primary target multi-component system having at least one primary target component by mapping at least one primary component to at least one primary target component, a comparison unit configured to compare the primary target multi-component system with at least one of a plurality of target multi-component systems, and a selection unit configured to select at least one best fit target multi-component system.

19 Claims, 2 Drawing Sheets

(56) References Cited

U.S. PATENT DOCUMENTS

Figure 1:
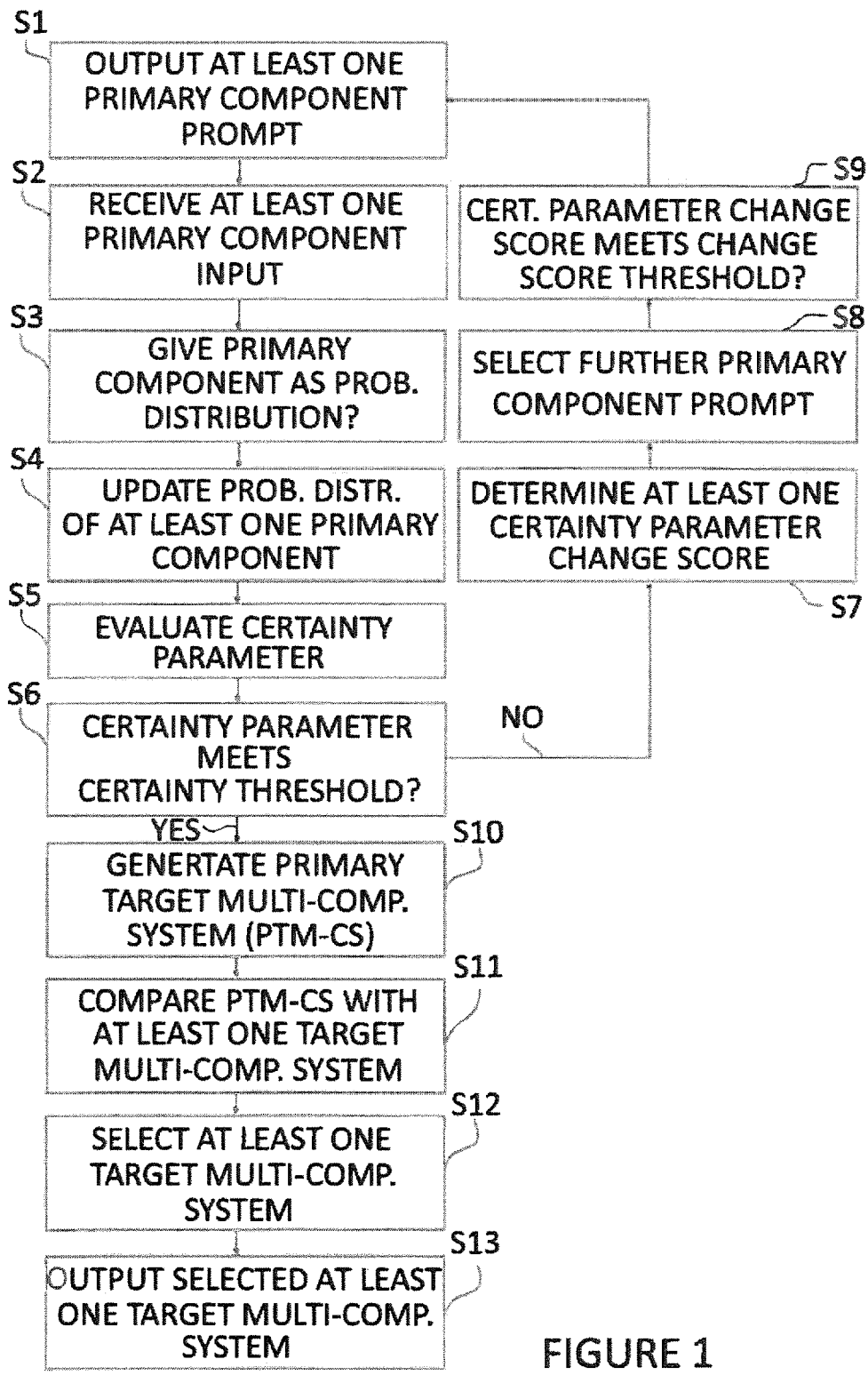

| | | | |
|---|---|---|---|
| 2013/0226539 A1* | 8/2013 | Shaw | G06Q 30/0201 703/2 |
| 2014/0122381 A1* | 5/2014 | Nowozin | G06N 20/00 706/12 |
| 2014/0191888 A1* | 7/2014 | Klejsa | H04N 19/91 341/107 |
| 2014/0250127 A1* | 9/2014 | Rhinelander | G06F 16/285 707/739 |

* cited by examiner

CONVERTER SYSTEM AND COMPUTER-IMPLEMENTED METHOD

CROSS-REFERENCE TO RELATED APPLICATIONS

The present application claims priority under 35 U.S.C. § 119(a) to EP Patent Application No. 19199845.9, filed Sep. 26, 2019, the contents of which are incorporated herein by reference for all purposes.

DESCRIPTION

The invention concerns a converter system for multi-component systems, a computer-implemented converter method for multi-component systems, a corresponding computer program product, and a corresponding non-transitory storage medium.

The invention lies in the field of multi-component systems, in particular in the field of conversion between multi-component systems. Matching and converting complex multi-component systems remains a problem in the modern economy. In particular such matching and converting often requires substantial and exhaustive knowledge of various complex multi-component systems, while such knowledge is often not readily available.

It is therefore an object of the invention to provide a converter method and a converter system for multi-component systems capable of efficiently and rapidly converting even an initially not well-defined primary multi-component system into at least one target multi-component system.

The object is solved at least by a converter system for multi-component systems, a computer-implemented converter method for multi-component systems, a corresponding computer program product, and a corresponding non-transitory storage medium according to the independent claims, while preferred embodiments form the subject of the dependent claims.

One aspect of the disclosure relates to a converter system for multi-component systems, comprising a multi-component system adjustment module and a multi-component system converter module. The multi-component system adjustment module comprises an input/output unit configured to perform the steps of a) outputting at least one primary component prompt of a plurality of primary component prompts, and b) receiving at least one primary component input in response to the at least one primary component prompt. The multi-component system adjustment module further comprises an adjustment unit configured to adjust at least one primary component of a primary multi-component system, wherein the adjustment unit is configured to, for each of the at least one primary component given as a probability distribution, perform the step of c) updating a probability distribution of at least one primary component in response to the at least one primary component input. The multi-component system adjustment module further comprises a certainty evaluation unit configured to perform the steps of d) evaluating a certainty parameter indicative of an entropy of the primary multi-component system, and e) comparing the certainty parameter of the primary multi-component system with a certainty threshold. The multi-component system adjustment module further comprises a prompt selection unit configured to, if the certainty parameter of the primary multi-component system does not meet the certainty threshold, perform the steps of f) determining a certainty parameter change score for each of the plurality of primary component prompts, g) selecting a further primary component prompt of the plurality of primary component prompts having a highest certainty parameter change score, and h) instructing the multi-component system adjustment module to perform steps a) to e) on the basis of the further primary component prompt, if the highest certainty parameter change score has a value greater than a change score threshold. The multi-component system converter module comprises a converter unit configured to, if the certainty parameter of the primary multi-component system at least meets the certainty threshold, generate a primary target multi-component system having at least one primary target component by mapping at least one primary component to at least one primary target component. The multi-component system converter module further comprises a comparison unit configured to compare the primary target multi-component system with at least one target multi-component system of a plurality of target multi-component systems. The multi-component system converter module further comprises a selection unit configured to select at least one target multi-component system, wherein the selected at least one target multi-component system is a best fit to the primary target multi-component system.

A multi-component system may be any type of multi-component system having at least two components. The components may comprise one or more physical components, such as physical units and/or devices, and/or one or more non-physical components, such as parameter components. For example, a multi-component system may for example be a domain entity comprising one or more entity attributes, wherein each entity attribute is a component of the domain entity and may take one or more values. In particular, each entity attribute may be given as a probability distribution over all possible values of the respective attribute. An exemplary primary multi-component system may therefore be given by Table 1 below, wherein the exemplary primary multi-component system is not to be interpreted as limiting the scope of the disclosure:

TABLE 1

| Attribute | Type | Value Range |
| --- | --- | --- |
| hasFamily | Discrete | Bool |
| status | Discrete | poor, collar, rich |
| carForWork | Discrete | Bool |
| longDistance | Discrete | Bool |
| spender | Discrete | tightwad, unconflicted, spendthrift |
| buyWithCash | Discrete | Bool |
| age | Discrete | young, middleAge, old |

An exemplary target multi-component system may therefore be given by Table 2 below, wherein the exemplary target multi-component system is not to be interpreted as limiting the scope of the disclosure:

TABLE 2

| Attribute | Type | Value Range |
| --- | --- | --- |
| price | Discrete | cheap, middlePrice, expensive |
| performance | Discrete | low, middle, high |
| type | Discrete | saloon, estate, coupe, cabrio, hatchback |
| engine | Discrete | otto, diesel, electric |

The input/output unit is configured to output at least one primary component prompt of a plurality of primary component prompts. The at least one primary component prompt may be targeted to request and/or indicate specific input, such as additional information regarding one or more primary components of the primary multi-component system. For example, at least one primary component prompt may be targeted to request a specific numerical input, such as an age parameter. Each primary component prompt of the plurality of primary component prompts may be associated with a set of one or more corresponding possible primary component inputs.

In particular, the input/output unit may be configured to output the at least one primary component prompt via an output interface unit. The output interface unit may be configured to provide the respective at least one primary component prompt as a prompt data signal, which may for example be an analogue and/or digital data signal. Alternatively or additionally, the output interface unit may be configured to provide the respective at least one primary component prompt by displaying the at least one primary component prompt on a display unit.

The input/output unit is configured to receive at least one primary component input in response to the at least one primary component prompt. In particular, the at least one primary component input may be at least one primary component input from the set of one or more corresponding possible primary component inputs associated with the outputted at least one primary component prompt. Preferentially, if one or more of the received primary component inputs are not part of the set of one or more corresponding possible primary component inputs associated with the outputted at least one primary component prompt, the input/output unit may be configured to output an input error signal. The at least one primary component input may be an information input and comprise, for example, additional information regarding one or more primary components of the primary multi-component system. For example, at least one primary component input may be a specific numerical input, such as an age parameter. The at least one primary component input may for example be a textual input or a voice input.

In particular, the input/output unit may be configured to receive the at least one primary component input via an input interface unit, wherein the input interface unit may for example comprise a keyboard and/or a microphone. The input interface unit may be configured to receive the respective at least one primary component input as an input data signal, which may for example be an analogue and/or digital input data signal.

In particular, the input/output unit may be configured to output the at least one primary component prompt prior to receiving the at least one primary component input. Alternatively, the input/output unit may be configured to output two or more primary component prompts and to receive two or more primary component inputs, wherein the input/output unit may be configured to await receiving a primary component input for a respective primary component prompt prior to outputting a next primary component prompt of the two or more primary component prompts. In particular, by outputting two or more primary component prompts, an efficiency of the converter system can be improved.

The adjustment unit is configured to adjust at least one primary component of a primary multi-component system. In particular, each primary component may take one or more values and may be given as a probability distribution over all possible values of the respective primary component. In particular, the adjustment unit may be configured to, for each of the at least one primary component given as a probability distribution, update a probability distribution of at least one primary component in response to the at least one primary component input. In a simple example, for a primary component given as a uniform probability distribution over values A, B, and C, the adjustment unit may be configured to update the uniform probability distribution to have a probability of 1 for value A, and a probability of 0 for each of B and C, if the at least one primary component input includes an input indicating that the respective primary component has a value of A. However, other means of updating a probability distribution may be used, such as adding one or more further probability distribution and averaging the resulting sum of probability distributions.

As an example, a primary component prompt may be the question "Do you have trouble limiting your spending?", wherein a respective primary component input may take the values {"rarely"; "sometimes"; "often"}. The adjustment unit may update a primary component "spender" in response to the respectively received input. For example, if the primary component "spender" is given as a probability distribution over the three values {"tightwad"; "unconflicted"; "spendthrift"}, the adjustment unit may calculate the average mean of the probability distribution of the primary component "spender" and an influence probability distribution associated with each primary component input value, i.e. associated with each received possible primary component input of a corresponding primary component prompt. An example of said influence probability distributions is given in Table 3 below:

TABLE 3

| Component Input Value | Influence probability distribution |
|---|---|
| rarely | (tightwad: 0.7; unconflicted: 0.2; spendthrift: 0.1) |
| sometimes | (tightwad: 0.1; unconflicted: 0.8; spendthrift: 0.1) |
| often | (tightwad: 0.1; unconflicted: 0.2; spendthrift: 0.7) |

The certainty evaluation unit is configured to evaluate a certainty parameter indicative of an entropy of the primary multi-component system. In particular, the certainty parameter may be the entropy of the primary multi-component system. However, any parameter indicative of the entropy of the primary multi-component system may be used as certainty parameter. Furthermore, the certainty value may be a measure of the level of acquired knowledge of the primary multi-component system, wherein each primary component input may change the level of acquired knowledge.

The certainty evaluation unit is configured to compare the certainty parameter of the primary multi-component system with a certainty threshold. In particular, the certainty threshold may be indicative of a minimum level of well-definedness of the primary multi-component system. In particular, the certainty threshold may be a parameter having a predetermined value and may be indicative of an entropy threshold of the primary multi-component system. The primary multi-component system may in particular have a maximum entropy if all primary components given as probability distributions correspond to uniform probability distributions, while the primary multi-component system may in particular have a minimum entropy if all primary components given as probability distributions indicating 100% probability for a respective specific value. The entropy threshold may therefore correspond to a threshold value at which the primary multi-component system is sufficiently well-defined.

The prompt selection unit is configured to, if the certainty parameter of the primary multi-component system does not meet the certainty threshold, determine at least one certainty parameter change score for each of the plurality of primary component prompts. In particular, for any primary component prompts, for which a respective primary component input has already been received, the respective certainty parameter change score may be set to zero in order to indicate that no further change in the certainty parameter would be affected by said respective primary component prompts. For each primary component prompt of the plurality of primary component prompts, for which no respective primary component input has been received, the respective certainty parameter change score may be indicative of a future change in the certainty parameter, preferentially towards the certainty threshold, as evaluated by the certainty evaluation unit, if the respective primary component prompt is next outputted by the input/output unit and at least one primary component input is received in response to the respective primary component prompt.

In particular, the determining of at least one certainty parameter change score for each of the plurality of primary component prompts may further comprise determining a certainty parameter change score for each possible primary component input of the set of one or more corresponding possible primary component inputs associated with the respective primary component prompt. For example, the certainty parameter change score of a specific possible primary component input may be the difference between the certainty parameter evaluated at step d) and a future certainty parameter evaluated at step d) after the corresponding primary input prompt associated with the specific possible primary component input is outputted and the specific possible primary component input is subsequently received in response to said corresponding input prompt.

The prompt selection unit is further configured to, if the certainty parameter of the primary multi-component system does not meet the certainty threshold, select a further primary component prompt of the plurality of primary component prompts having a highest certainty parameter change score. The highest certainty parameter change score may be indicative of a biggest possible change in the certainty parameter towards the certainty threshold if the multi-component system adjustment module were to next perform steps a) to e) on the basis of the further primary component prompt. In particular, by selecting such a further primary component prompt, it is possible for the primary multi-component system to quickly reach a stage at which the certainty evaluation unit evaluates a respective certainty parameter meeting the certainty threshold, thereby significantly increasing both the speed and efficiency of the converter system.

Preferentially, the further primary component prompt may be selected by finding the minimax amongst the certainty parameter change scores of each of the plurality of primary component prompts. For example, the prompt selection unit may be configured to determine, for each primary component prompt of the plurality of primary component prompts, a certainty parameter change score for each possible primary component input of the set of one or more corresponding possible primary component inputs associated with the respective primary component prompt, wherein each certainty parameter change score may be indicative of a future change in the certainty parameter relative to the certainty threshold, as evaluated by the certainty evaluation unit, if the associated primary component prompt is next outputted by the input/output unit and the respective possible primary component input is received in response to the associated primary component prompt.

The prompt selection unit may then further be configured to select, for each primary component prompt of the plurality of primary component prompts, a worst possible primary component input. The worst possible primary component input of a respective primary component prompt may be a possible primary component input associated with the respective primary component prompt having the lowest certainty parameter change score in comparison with the certainty parameter change scores of all other possible primary component inputs associated with the respective primary component prompt. The lowest certainty parameter change score may be indicative of a biggest future change in the certainty parameter away from the certainty threshold and/or a smallest future change in the certainty parameter towards the certainty threshold, as evaluated by the certainty evaluation unit, if the associated primary component prompt is next outputted by the input/output unit and the respective possible primary component input is received in response to the associated primary component prompt.

The prompt selection unit may further be configured to select among all worst possible primary component inputs a minimax possible primary component input. The minimax possible primary component input may correspond to one of the worst possible primary component inputs having a certainty parameter change score indicative of a biggest future change in the certainty parameter towards the certainty threshold and/or a smallest future change in the certainty parameter away from the certainty threshold, as evaluated by the certainty evaluation unit, if the associated primary component prompt is next outputted by the input/output unit and the minimax possible primary component input is received in response to the associated primary component prompt, in comparison to all other worst possible primary component inputs. The prompt selection unit may further be configured to select the primary component prompt associated to the minimax possible primary component input as the further primary component prompt.

The prompt selection unit is further configured to, if the certainty parameter of the primary multi-component system does not meet the certainty threshold, instruct the multi-component system adjustment module to perform steps a) to e) on the basis of the further primary component prompt, if the highest certainty parameter change score has a value greater than a change score threshold. In particular, the change score threshold may be indicative of a minimum change score value in order to prevent the converter system from looping through steps a) to e) for ever further infinitesimally small highest certainty parameter change scores.

The converter unit is configured to, if the certainty parameter of the primary multi-component system at least meets the certainty threshold, generate a primary target multi-component system having at least one primary target component by mapping at least one primary component to at least one primary target component. In particular, each primary component may influence at most each primary target component, such that the maximum number of mappings is the product of the number of primary component with the number of primary target components. In particular, by generating a primary target multi-component system from the primary multi-component system, an easier comparison with each of the target multi-component systems is possible. Specifically, the primary target multi-component systems and the target multi-component systems may share the same set of primary target components, while the specific values for each of the primary target components may differ between the primary target multi-component systems and the target multi-component systems. In other words, the set of primary target components and a set of target components of the target multi-component systems may be substantially identical, while each of the primary target components and the target components can take a value over its respective range of possible values.

Preferentially, the mapping may comprise mapping at least one primary component, given as a probability distribution over all possible values of the respective primary component, to a corresponding at least one primary target component, given as a probability distribution over all possible values of the respective primary target component. Alternatively, the mapping may comprise mapping at least one primary component, given as a probability distribution over all possible values of the respective primary component, to a corresponding at least one primary target component, given as a specific value of all possible values of the respective primary target component.

The comparison unit is configured to compare the primary target multi-component system with at least one target multi-component system of a plurality of target multi-component systems. In particular, the comparison unit may be configured to compare the primary target multi-component system with each of the target multi-component systems of a plurality of target multi-component systems. Specifically, the comparison unit may be configured to determine at least one target multi-component system being the best fit to the primary target multi-component system. In other words, the comparison unit may be configured to determine at least one target multi-component system having a highest similarity to the primary target multi-component system.

The selection unit is configured to select at least one target multi-component system, wherein the selected at least one target multi-component system is a best fit to the primary target multi-component system. Thereby the selection unit may be configured to select the at least one target multi-component system having a highest similarity to the primary target multi-component system. Preferentially, the selection unit is configured to output the selected at least one target multi-component system as an output data signal and/or to display the selected at least one target multi-component system on an output display unit.

The converter system is therefore able to efficiently and rapidly convert even an initially not well-defined primary multi-component system into at least one target multi-component system.

Preferentially, at least one primary component can take discrete values or continuous values. In particular, the at least one primary component may be a primary parameter component.

Preferentially, at least one primary target component can take discrete values or continuous values. In particular, the at least one primary target component may be a primary target parameter component.

Preferentially, at least one target multi-component system comprises at least one target component, wherein at least one target component can take discrete values or continuous values. In particular, the at least one target component may be a target parameter component.

Preferentially, each primary component prompt is an input request. An input request may take any number of formats. For example, the input request may be an indication to a user that an input is necessary. The user may, for example, be a human user or a digital entity, such as a program or app. Preferentially, at least one primary component prompt may require an input of an exact value of at least one of the primary components. Furthermore, the plurality of primary component prompts may be a predetermined list of input requests. Furthermore, at least one input request may be a multiple-choice question, wherein the multiple-choice question is preferentially presented to the user.

Preferentially, evaluating the certainty parameter further comprises determining a component certainty parameter for each primary component on the basis of the probability distribution of the respective primary component. In particular, the component certainty parameter for each primary component may be indicative of an entropy of the respective primary component. In particular, the component certainty parameter for each primary component may be an entropy value of the respective primary component. Preferentially, evaluating the certainty parameter further comprises determining the certainty parameter on the basis of the component certainty parameters. In particular, determining the certainty parameter may for example comprise calculating the arithmetic mean of the component certainty parameters. In particular, determining the certainty parameter may for example comprise calculating the arithmetic mean of the entropy values of each respective primary component.

Preferentially, the converter unit is further configured to, if the certainty parameter does not meet the certainty parameter threshold and if the highest certainty parameter change score has a value not greater than the change score threshold, generate the primary target multi-component system having at least one primary target component by mapping at least one primary component to at least one primary target component. Furthermore, the comparison unit may preferentially be configured to subsequently compare the primary target multi-component system with at least one target multi-component system of a plurality of target multi-component systems, if the certainty parameter does not meet the certainty parameter threshold and if the highest certainty parameter change score has a value not greater than the change score threshold. Furthermore, the selection unit may preferentially be configured to subsequently select at least one target multi-component system, wherein the selected at least one target multi-component system is a best fit to the primary target multi-component system, if the certainty parameter does not meet the certainty parameter threshold and if the highest certainty parameter change score has a value not greater than the change score threshold.

In particular, the converter system may therefore be able to still convert the primary multi-component system into a best fit target multi-component system, even if the certainty parameter does not meet the certainty parameter threshold and if the highest certainty parameter change score has a value not greater than the change score threshold.

Preferentially, the mapping at least one primary component to at least one primary target component comprises using at least one conditional probability table. In other words, the converter unit is preferentially configured to generate a primary target multi-component system having at least one primary target component by mapping at least one primary component to at least one primary target component, wherein the mapping at least one primary component to at least one primary target component comprises using at least one conditional probability table. In particular, the at least one conditional probability table may be based on Bayesian conditional probability. For example, a conditional probability table used to map the primary component "spender" having the possible values {"tightwad"; "unconflicted"; "spendthrift"} to a primary target component "price" having the possible values {"cheap"; "middlePrice"; "expensive"} may take the form as shown in Table 4.

TABLE 4

| "spender" | "price" |
| --- | --- |
| tightwad | cheap: 0.5; middlePrice: 0.4; expensive: 0.1 |
| unconflicted | cheap: 0.2; middlePrice: 0.6; expensive: 0.2 |
| spendthrift | cheap: 0.1; middlePrice: 0.4; expensive: 0.5 |

In the above example, the primary component "spender" may be mapped on the basis of the value of said primary component "spender" to a corresponding primary target component "price" given as a probability distribution according to the conditional probability table. Furthermore, when the respective primary component, such as "spender" in the example given above, is itself given as a probability distribution over all its possible values, the conditional probability table may be weighted according to the probability distribution of the respective primary component.

Furthermore, one or more different primary components may have a conditional probability table mapping each of the one or more different primary components to at least the same primary target component. In such a case, the probability distribution of a primary target component may be a combination of the probability distributions of the respective primary target component given according to each of the conditional probability tables mapping each of the one or more different primary components to the same primary target component. In particular, the probability distribution of the primary target component may be an arithmetic mean of the probability distributions of the respective primary target component given according to said conditional probability tables.

Preferentially, the adjustment unit may be configured to, for each primary component not given as a probability distribution, perform a step of giving the respective primary component as a uniform probability distribution and/or a non-uniform probability distribution in response to the at least one primary component input. In particular, it is thereby possible to initialize primary components according to respective primary component input, or, in other words, to set an initial probability distribution for at least one primary component such that the adjustment unit is capable of updating said initial probability distribution in response to other primary component inputs. For example, a primary component input may be to initialize a primary parameter component "age" to be able to take a value in the range {"young"; "middleAge"; "old"} having a uniform probability distribution. The adjustment unit may determine that the primary parameter component is not yet given as a probability distribution, and consequently give the primary parameter component "age" as a uniform probability distribution over the range of possible values {"young"; "middle-Age"; "old"}. In another example, a primary component input may be to initialize a primary parameter component "age" to be able to take a value in the range {"young"; "middleAge"; "old"}, wherein the primary parameter component "age" is twice as likely to take the value "young", as each of the values "middleAge" and "old". The adjustment unit may determine that the primary parameter component is not yet given as a probability distribution, and consequently give the primary parameter component "age" as a non-uniform probability distribution over the range of possible values {"young"; "middleAge"; "old"} with the probability p("young")=½, p("middleAge")=¼, and p("old")=¼. In particular, it may therefore be possible to further increase the efficiency of the converter system by allowing predetermined input and information concerning at least one of the primary components to be included by giving the respective at least one of the primary components as a corresponding uniform probability distribution or a non-uniform probability distribution.

Preferentially, the comparing the primary target multi-component system with at least one target multi-component system comprises calculating a Euclidean distance between the primary target multi-component system and each of the at least one target multi-component systems. In other words, the comparison unit may be further configured to calculate a Euclidean distance between the primary target multi-component system and each of the at least one target multi-component systems. Furthermore, the selected at least one target multi-component system being the best fit to the primary target multi-component system may be the at least one target multi-component system having the shortest Euclidean distance to the primary target multi-component system. However, the disclosure is not limited to Euclidean distances. For example, any other type of distance function may be used to determine the at least one target multi-component system being the best fit to the primary target multi-component system.

Preferentially, the selection unit may be configured to rank all target multi-component systems in relation to the primary target multi-component system, such as for example according to how similar each of the target multi-component systems is to the primary target multi-component system. Preferentially, the selection unit may be configured to rank all target multi-component systems by calculating the Euclidean distance between the primary target multi-component system and each of the at least one target multi-component systems and assigning the respective Euclidean distance to the respective target multi-component as a rank. However, the selection unit is not limited to such a ranking scheme, and may instead use any type of ranking scheme to rank the target multi-component systems.

Preferentially, the Euclidean distance between the primary target multi-component system and each of the selected at least one target multi-component system is outputted as a confidence score. In other words, the converter system is configured to output the Euclidean distance between the primary target multi-component system and each of the selected at least one target multi-component system is outputted as a confidence score. However, the disclosure is not limited to such a confidence score. The confidence score may in particular be a measure of how similar the primary target multi-component system and the respective at least one target multi-component system are. Therefore, any measure of how similar the primary target multi-component system and the respective at least one target multi-component system are may be used as confidence score.

Preferentially, the converter system is configured to only output the selected at least one target multi-component system and a confidence score of the respective at least one target multi-component system.

In the following, an example of the converter system is given, wherein said example is not to be interpreted as limiting the scope of the disclosure. In particular, said example is only one of a plurality of embodiments of this disclosure. In said example, the converter system for multi-component systems may be a converter system for converting a multi-component user profile into a multi-component target profile; the multi-component system adjustment module may be a user profile adjustment module; the at least one primary component prompt may be at least one information input request and the plurality of primary component prompts may be a plurality of information input requests; the at least one primary component input may be at least one information input; the at least one primary component may be at least one user profile attribute and the primary multi-component system may be a user profile; the certainty parameter may be an entropy parameter; the certainty threshold may be an entropy threshold; the prompt selection unit may be an information input request selection unit; the certainty parameter change score may be an entropy parameter change score; the further primary component prompt is a further information input request; the highest certainty parameter change score may be a highest entropy parameter change score; the primary target multi-component system may be a target user profile and the at least one primary target component may be at least one target user profile attribute; the at least one target multi-component system may be at least one target profile and the plurality of target multi-component systems may be a plurality of target profiles.

Therefore, an exemplary converter system may comprise:
a user profile adjustment module, comprising:
an input/output unit configured to perform the steps of:
a) outputting at least one information input request of a plurality of information input requests, and
b) receiving at least one information input in response to the at least one information input request;
an adjustment unit configured to adjust at least one user profile attribute of a user profile, wherein the adjustment unit is configured to, for each of the at least one user profile attributes given as a probability distribution, perform the step of:
c) updating a probability distribution of at least one user profile attribute in response to the at least one information input;
a certainty evaluation unit configured to perform the steps of:
d) evaluating an entropy parameter indicative of an entropy of the user profile, and
e) comparing the entropy parameter of the user profile with an entropy threshold;
an information input request selection unit configured to, if the entropy parameter of the user profile does not meet the entropy threshold, perform the steps of:
f) determining an entropy parameter change score for each of the plurality of information input requests,
g) selecting a further information input request of the plurality of information input requests having a highest entropy parameter change score, and
h) instructing the user profile adjustment module to perform steps a) to e) on the basis of the further information input request, if the highest entropy parameter change score has a value greater than a change score threshold;
a user profile converter module, comprising:
a converter unit configured to, if the entropy parameter of the user profile at least meets the entropy threshold, generate a target user profile having at least one target user profile attribute by mapping at least one user profile attribute to at least one target user profile attribute;
a comparison unit configured to compare the target user profile with at least one target profile of a plurality of target profiles; and
a selection unit configured to select at least one target profile, wherein the selected at least target profile is a best fit to the target user profile.

Thereby the above exemplary converter system can efficiently and rapidly convert an initially not well-defined user profile into at least one target profile.

A converter system according to this disclosure is not limited to the above exemplary embodiments. Rather, a converter system may comprise any combination of features as described in the description and the appended Figures.

One aspect of the disclosure relates to a computer-implemented converter method for multi-component systems, comprising:
a) outputting, by an input/output unit, at least one primary component prompt of a plurality of primary component prompts,
b) receiving, by the input/output unit, at least one primary component input in response to the at least one primary component prompt;
c) updating, by an adjustment unit, a probability distribution of at least one primary component in response to the at least one primary component input, if each of the at least one primary component is given as a probability distribution;
d) evaluating, by a certainty evaluation unit, a certainty parameter indicative of an entropy of the primary multi-component system;
e) comparing, by the certainty evaluation unit, the certainty parameter of the primary multi-component system with a certainty threshold,
wherein the method, if the certainty parameter of the primary multi-component system does not meet the certainty threshold, further comprises performing the steps of:
f) determining, by a prompt selection unit, a certainty parameter change score for each of the plurality of primary component prompts;
g) selecting, by the prompt selection unit, a further primary component prompt of the plurality of primary component prompts having a highest certainty parameter change score;
h) performing steps a) to e) on the basis of the further primary component prompt, if the highest certainty parameter change score has a value greater than a change score threshold;
wherein the method, if the certainty parameter of the primary multi-component system at least meets the certainty threshold, further comprises performing the steps of:
i) generating, by a converter unit, a primary target multi-component system having at least one primary target component by mapping at least one primary component to at least one primary target component;
j) comparing, by a comparison unit, the primary target multi-component system with at least one target multi-component system of a plurality of target multi-component systems; and
k) selecting, by a selection unit, at least one target multi-component system, wherein the selected target multi-component system is a best fit to the primary target multi-component system.

Preferentially, each primary component prompt may be an input request, and, optionally, the plurality of primary component prompts may be a predetermined list of input requests.

Preferentially, evaluating the certainty parameter may further comprise determining a component certainty parameter for each primary component on the basis of the probability distribution of the respective primary component, and determining the certainty parameter on the basis of the component certainty parameters. Furthermore, the determining the certainty parameter may further comprise calculating the arithmetic mean of the component certainty parameters.

Preferentially, the method may further comprise performing steps i) to k), if the certainty parameter does not meet the certainty parameter threshold and if the highest certainty parameter change score has a value not greater than the change score threshold.

Preferentially, the mapping at least one primary component to at least one primary target component comprises using at least one conditional probability table.

Preferentially, the method further comprises the step of c0) for each primary component not given as a probability distribution, giving, by the adjustment unit, the respective primary component as a uniform probability distribution and/or a non-uniform probability distribution in response to the at least one primary component input.

Preferentially, comparing the primary target multi-component system with at least one target multi-component system comprises calculating a Euclidean distance between the primary target multi-component system and each of the at least one target multi-component systems. Furthermore, preferentially, the selected at least one target multi-component system being the best fit to the primary target multi-component system is the at least one target multi-component system having the shortest Euclidean distance to the primary target multi-component system.

A computer-implemented converter method according to this disclosure is not limited to the above exemplary embodiments. Rather, a computer-implemented converter method may comprise any combination of features as described in the description, such as for the converter system above, and the appended Figures.

One aspect of the disclosure relates to a computer program product comprising computer-readable instructions, which, when the program is executed by a computer, cause the computer to carry out a computer-implemented method according to the computer-implemented converter method described above. Preferentially, the computer program product comprises computer-readable instructions, which, when the program is executed by the computer, cause the computer to carry out a computer-implemented method according to at least the following steps:
  a) outputting, by an input/output unit, at least one primary component prompt of a plurality of primary component prompts,
  b) receiving, by the input/output unit, at least one primary component input in response to the at least one primary component prompt;
  c) updating, by an adjustment unit, a probability distribution of at least one primary component in response to the at least one primary component input, if each of the at least one primary component is given as a probability distribution;
  d) evaluating, by a certainty evaluation unit, a certainty parameter indicative of an entropy of the primary multi-component system;
  e) comparing, by the certainty evaluation unit, the certainty parameter of the primary multi-component system with a certainty threshold,
  wherein the method, if the certainty parameter of the primary multi-component system does not meet the certainty threshold, further comprises performing the steps of:
  f) determining, by a prompt selection unit, a certainty parameter change score for each of the plurality of primary component prompts;
  g) selecting, by the prompt selection unit, a further primary component prompt of the plurality of primary component prompts having a highest certainty parameter change score;
  h) performing steps a) to e) on the basis of the further primary component prompt, if the highest certainty parameter change score has a value greater than a change score threshold;
  wherein the method, if the certainty parameter of the primary multi-component system at least meets the certainty threshold, further comprises performing the steps of:
  i) generating, by a converter unit, a primary target multi-component system having at least one primary target component by mapping at least one primary component to at least one primary target component;
  j) comparing, by a comparison unit, the primary target multi-component system with at least one target multi-component system of a plurality of target multi-component systems; and
  k) selecting, by a selection unit, at least one target multi-component system, wherein the selected target multi-component system is a best fit to the primary target multi-component system.

Preferentially, the computer program product may comprise any combination of features described herein, such as for example as described for the converter system and the converter method above and the appended Figures and their description.

One aspect of the disclosure relates to a non-transitory storage medium containing computer-readable instructions that, when executed by a computer, cause the computer to carry out a computer-implemented method according to the computer-implemented converter method described above. Preferentially, the computer program product comprises computer-readable instructions, which, when the program is executed by the computer, cause the computer to carry out a computer-implemented method according to at least the following steps:
  a) outputting, by an input/output unit, at least one primary component prompt of a plurality of primary component prompts,
  b) receiving, by the input/output unit, at least one primary component input in response to the at least one primary component prompt;
  c) updating, by an adjustment unit, a probability distribution of at least one primary component in response to the at least one primary component input, if each of the at least one primary component is given as a probability distribution;
  d) evaluating, by a certainty evaluation unit, a certainty parameter indicative of an entropy of the primary multi-component system;
  e) comparing, by the certainty evaluation unit, the certainty parameter of the primary multi-component system with a certainty threshold,
  wherein the method, if the certainty parameter of the primary multi-component system does not meet the certainty threshold, further comprises performing the steps of:
  f) determining, by a prompt selection unit, a certainty parameter change score for each of the plurality of primary component prompts;
  g) selecting, by the prompt selection unit, a further primary component prompt of the plurality of primary component prompts having a highest certainty parameter change score;

h) performing steps a) to e) on the basis of the further primary component prompt, if the highest certainty parameter change score has a value greater than a change score threshold;

wherein the method, if the certainty parameter of the primary multi-component system at least meets the certainty threshold, further comprises performing the steps of:

i) generating, by a converter unit, a primary target multi-component system having at least one primary target component by mapping at least one primary component to at least one primary target component;

j) comparing, by a comparison unit, the primary target multi-component system with at least one target multi-component system of a plurality of target multi-component systems; and k) selecting, by a selection unit, at least one target multi-component system, wherein the selected target multi-component system is a best fit to the primary target multi-component system.

Preferentially, the computer program product may comprise any combination of features described herein, such as for example as described for the converter system and the converter method above and the appended Figures and their description.

The disclosure will now be further explained using exemplary embodiments shown in the appended Figures. In particular, the exemplary embodiments and the appended Figures are intended to be illustrative only and are therefore not to be interpreted as limiting the scope of the disclosure. In particular, the following Figures show:

FIG. 1: an illustrative flow diagram of an exemplary converter method

Figure 2:
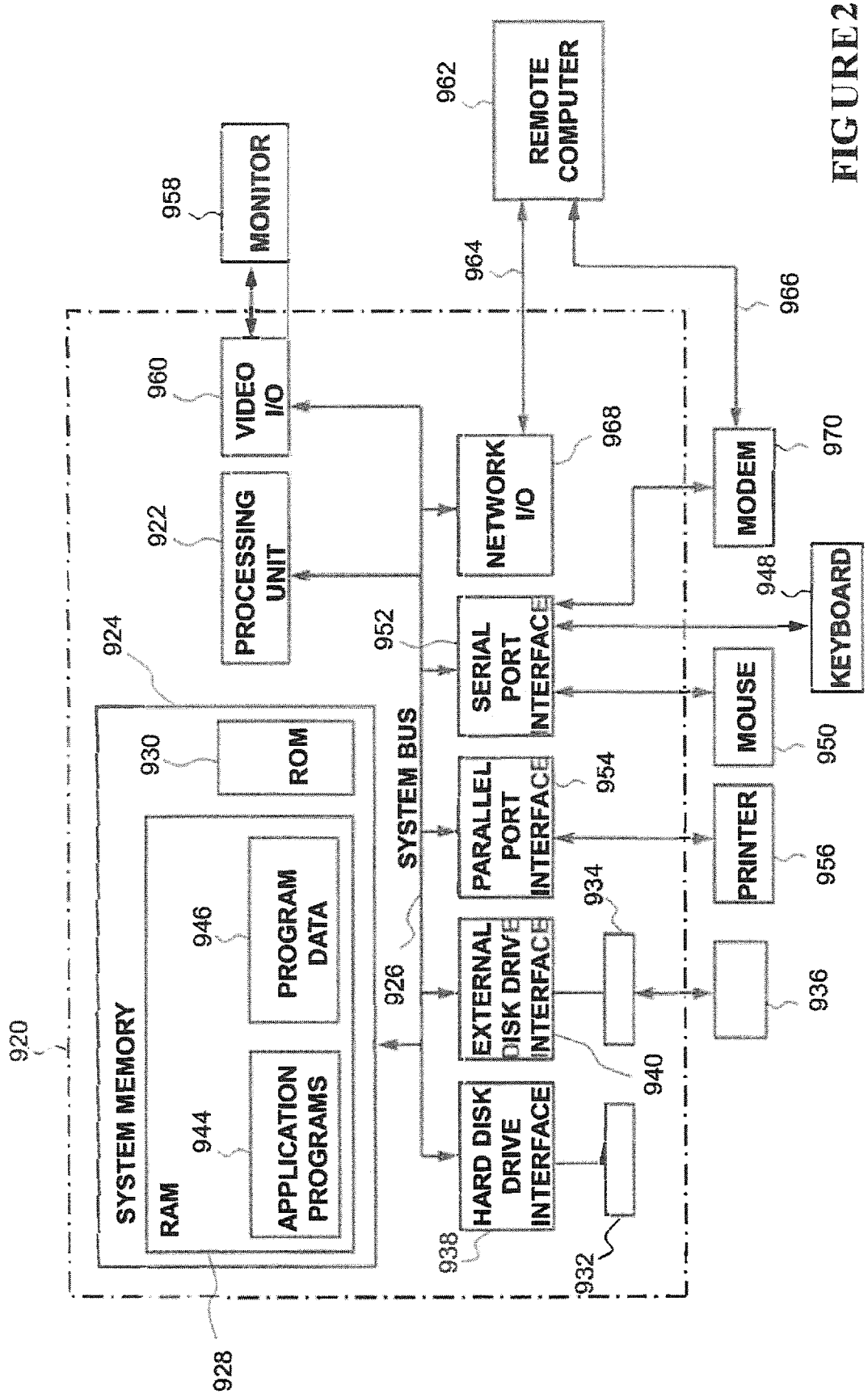

FIG. 2: an exemplary system.

FIG. 1 shows an illustrative flow diagram of an exemplary converter method.

In the shown example, it is intended to convert a primary multi-component system having, for ease of explanation, only one primary component into a best fit target multi-component system. In particular, the primary multi-component system may have a primary component "spender", which is a parameter component and may take the values {"tightwad"; "unconflicted"; "spendthrift"}. Prior to applying the exemplary method, the primary component "spender" is not yet given as a probability distribution.

In exemplary step S1, an input/output unit may output a first primary component prompt of a plurality of primary component prompts. In the show example, said first primary component prompt may be a first input request, said first input request requesting further information regarding the primary component "spender".

In exemplary step S2, the input/output unit may receive at least one primary component input in response to the at least one primary component prompt. In particular, said at least one primary component input may include an information that the primary component "spender" is to be given a uniform probability distribution over all possible values.

In exemplary step S3, the adjustment unit determines that the primary component "spender" is not given as a probability distribution and subsequently gives the primary component "spender" as a uniform probability distribution and/or a non-uniform probability distribution in response to the at least one primary component input. In the present example, the primary component "spender" is therefore given as a probability distribution as shown in Table 5:

TABLE 5

| primary component "spender" value | probability |
| --- | --- |
| tightwad | 1/3 |
| unconflicted | 1/3 |
| spendthrift | 1/3 |

In exemplary step S4, the adjustment unit determines that the primary component "spender" is given as a probability distribution and subsequently updates the probability distribution of the primary component "spender" in response to the received primary component input. In the shown example, no further information regarding the primary component "spender" is included in the received primary component input, and consequently, the respective probability distribution is not further changed during the updating.

In exemplary step S5, a certainty evaluation unit evaluates a certainty parameter indicative of the entropy of the primary multi-component system. In particular, the certainty evaluation unit evaluates an entropy parameter being indicative of the entropy of the primary multi-component system. Preferentially, the entropy parameter may be the Shannon entropy H(X) of the primary multi-component system, and may for example be calculated by applying the equation (1).

$$H(X) = -\sum_i p(x_i) \log p(x_i) \quad (1)$$

In exemplary step S6, the certainty evaluation unit compares the evaluated certainty parameter of the primary multi-component system with a certainty threshold. In particular, as the primary component "spender" is the only primary component of the primary multi-component system, and is given by a uniform probability distribution over all possible values, the entropy of the primary multi-component system has a maximal value. Furthermore, for ease of explanation, it is assumed that the certainty threshold in the present example is an entropy threshold, wherein the evaluated entropy parameter has a value above the entropy threshold and thus does not meet said entropy threshold.

As the entropy parameter does not meet the entropy threshold, the method moves to exemplary step S7. In exemplary step S7, if the entropy parameter of the primary multi-component system does not meet the entropy threshold, a prompt selection unit determines a certainty parameter change score, in particular an entropy parameter change score, for each of the plurality of primary component prompts.

As an example, one of the plurality of primary component prompts may be the question "Do you have trouble limiting your spending?", wherein a respective primary component input may take the values {"rarely"; "sometimes"; "often"}. Each primary component input value of the above primary component input may be associated to an influence probability distribution. An example of said influence probability distributions is given in Table 3, as already recited above:

TABLE 3

| Component Input Value | Influence probability distribution |
| --- | --- |
| rarely | (tightwad: 0.7; unconflicted: 0.2; spendthrift: 0.1) |
| sometimes | (tightwad: 0.1; unconflicted: 0.8; spendthrift: 0.1) |
| often | (tightwad: 0.1; unconflicted: 0.2; spendthrift: 0.7) |

In exemplary step S8, the prompt selection unit selects a further primary component prompt of the plurality of primary component prompts having a highest certainty parameter change score. For the purposes of this explanatory example, it is assumed that the primary component input prompt of Table 3 above has the highest entropy parameter change score out of all the entropy parameter change scores of the plurality of primary component prompts. Therefore, the prompt selection unit selects the primary component prompt of Table 3 as the further primary component prompt.

In exemplary step S9, it is determined if the highest certainty parameter change score has a value greater than a change score threshold. In particular, by introducing such a determination step, it may be possible to determine whether the highest certainty parameter change score is sufficiently large to warrant outputting the further primary component prompt, thereby significantly increasing the overall efficiency of the method. If the highest certainty parameter change score has a value greater than a change score threshold, the method performs steps S1 to S6 on the basis of the further primary component prompt. In the present example, it is assumed that the highest certainty parameter change score has a value greater than the change score threshold.

The method now returns to exemplary step S1. In exemplary step S1, the input/output unit outputs the further primary component prompt.

In exemplary step S2, the input/output unit receives a primary component input in response to the further primary component prompt. In the present example, the primary component input may include one of the component input values of the further primary component prompt "Do you have trouble limiting your spending?". In the present example, it is assumed that the primary component input includes the component input value "sometimes" in response to the further primary component prompt "Do you have trouble limiting your spending?".

In exemplary step S3, the adjustment unit determines that the primary component "spender" is given as a probability distribution and subsequently moves on to step S4.

In exemplary step S4, the adjustment unit determines that the primary component "spender" is given as a probability distribution and subsequently updates the probability distribution of the primary component "spender" in response to the received further primary component input. In particular, the updating the probability distribution comprises forming the arithmetic mean of the current probability distribution and the probability distribution corresponding to the further primary component input. As a result, the primary component "spender" is given by the updated probability distribution, as shown in Table 6:

TABLE 6

| primary component "spender" value | probability |
| --- | --- |
| tightwad | 13/60 |
| unconflicted | 34/60 |
| spendthrift | 13/60 |

In exemplary step S5, a certainty evaluation unit evaluates a certainty parameter indicative of the entropy of the updated primary multi-component system. In particular, the certainty evaluation unit evaluates an entropy parameter being indicative of the entropy of the updated primary multi-component system.

In exemplary step S6, the certainty evaluation unit compares the evaluated entropy parameter of the updated primary multi-component system with an entropy threshold. For ease of explanation, it is assumed evaluated entropy parameter now has a value below the entropy threshold and thus does meet said entropy threshold.

In exemplary step S10, if the entropy parameter of the primary multi-component system at least meets the entropy threshold, a converter unit generates a primary target multi-component system having at least one primary target component by mapping at least one primary component to at least one primary target component. In the presented example, the converter unit generates a primary target multi-component system having a primary target component "price" by mapping the primary component "spender" to the primary target component "price". In the present example, said mapping is achieved by using a conditional probability table to map the primary component "spender" to the primary target component "price" as a probability distribution over all possible values of the primary target component "price". In the present example the possible values of the primary target component "price" are {"cheap"; "middlePrice"; "expensive"}, wherein the used conditional probability table is given by Table 4, as already recited above:

TABLE 4

| "spender" | "price" |
| --- | --- |
| tightwad | cheap: 0.5; middlePrice: 0.4; expensive: 0.1 |
| unconflicted | cheap: 0.2; middlePrice: 0.6; expensive: 0.2 |
| spendthrift | cheap: 0.1; middlePrice: 0.4; expensive: 0.5 |

Furthermore, as the primary component "spender" is given as a probability distribution over all three values {"tightwad"; "unconflicted"; "spendthrift"}, the conditional probability table in Table 4 is weighted according to the probability of the respective value of the primary component "spender" and summed to give the primary target component "price" as a probability distribution over all respectively possible values. The result is presented in Table 7:

TABLE 7

| primary target component "price" value | probability |
| --- | --- |
| cheap | 146/600 |
| middlePrice | 308/600 |
| expensive | 146/600 |

In exemplary step S11, a comparison unit is configured to compare the primary target multi-component system with at least one target multi-component system of a plurality of target multi-component systems. In the present example, the plurality of target multi-component systems comprises a first target multi-component system having "price"="cheap", a second target multi-component system having "price"="middlePrice", and a third target multi-component system having "price"="expensive". In other words, the plurality of target multi-component systems comprises a first target multi-component system having p("cheap")=1, a second target multi-component system having p("middlePrice")=1, and a third target multi-component system having p("expensive")=1. In the present example, comparing the primary target multi-component system with the first target multi-component system, the second target multi-component system, and the third target multi-component system comprises calculating a Euclidean distance between the primary target multi-component system and each of the target multi-component systems.

In exemplary step S12, a selection unit is configured to select at least one target multi-component system, wherein the selected at least one target multi-component system is a best fit to the primary target multi-component system. In the present example, the selected at least one target multi-component system being the best fit to the primary target multi-component system may be the at least one target multi-component system having the shortest Euclidean distance to the primary target multi-component system. Therefore, given the exemplary target multi-component systems above, the selection unit selects the second target multi-component system as the best fit to the primary target multi-component system. Preferentially, the selected target multi-component system and, optionally, the associated calculated Euclidean distance may be output by the selection unit as a data signal in a final step S13.

The converter method and a corresponding converter system is therefore able to efficiently and rapidly convert even an initially not well-defined primary multi-component system into at least one target multi-component system.

FIG. 2 shows an exemplary system for implementing the claimed subject matter including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIG. 1.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 2 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 2 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. It will be appreciated that the network connections shown are exemplary and other means of establishing a communications link between the electronic devices may be used.

The above-described computing system is only one example of the type of computing system that may be used to implement the method.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A converter system for multi-component systems, comprising:
a memory storing processor-executable instructions; and
a processor to execute the processor-executable instructions in order to cause:
a multi-component system adjustment module, comprising:
an input/output unit configured to perform the steps of:
a) outputting at least one primary component prompt of a plurality of primary component prompts, and
b) receiving at least one primary component input in response to the at least one primary component prompt;
an adjustment unit configured to adjust at least one primary component of a primary multi-component system, wherein the adjustment unit is configured to, for each of the at least one primary component given as a probability distribution, perform the step of:
c) updating a probability distribution of at least one primary component in response to the at least one primary component input;
a certainty evaluation unit configured to perform the steps of:
d) evaluating a certainty parameter indicative of an entropy of the primary multi-component system, and
e) comparing the certainty parameter of the primary multi-component system with a certainty threshold;
a prompt selection unit configured to, if the certainty parameter of the primary multi-component system does not meet the certainty threshold, perform the steps of:
f) determining a certainty parameter change score for each of the plurality of primary component prompts,
g) selecting a further primary component prompt of the plurality of primary component prompts having a highest certainty parameter change score, and
h) instructing the multi-component system adjustment module to perform steps a) to e) on the basis of the further primary component prompt, if the highest certainty parameter change score has a value greater than a change score threshold;
a multi-component system converter module, comprising:
a converter unit configured to, if the certainty parameter of the primary multi-component system at least meets the certainty threshold, generate a primary target multi-component system having at least one primary target component by mapping at least one primary component to at least one primary target component;
a comparison unit configured to compare the primary target multi-component system with at least one target multi-component system of a plurality of target multi-component systems; and
a selection unit configured to select at least one target multi-component system, wherein the selected at least one target multi-component system is a best fit to the primary target multi-component system.

2. The converter system for multi-component systems according to claim 1, wherein each primary component prompt is an input request, and, optionally, wherein the plurality of primary component prompts is a predetermined list of input requests.

3. The converter system for multi-component systems according to claim 1, wherein evaluating the certainty parameter further comprises:
  determining a component certainty parameter for each primary component on the basis of the probability distribution of the respective primary component; and
  determining the certainty parameter on the basis of the component certainty parameters, and, optionally, wherein the determining the certainty parameter comprises calculating the arithmetic mean of the component certainty parameters.

4. The converter system for multi-component systems according to claim 3, wherein the converter unit is further configured to, if the certainty parameter does not meet the certainty parameter threshold and if the highest certainty parameter change score has a value not greater than the change score threshold, generate the primary target multi-component system having at least one primary target component by mapping at least one primary component to at least one primary target component.

5. The converter system for multi-component systems according to claim 1, wherein the mapping at least one primary component to at least one primary target component comprises using at least one conditional probability table.

6. The converter system for multi-component systems according to claim 1, wherein the adjustment unit is configured to, for each primary component not given as a probability distribution, perform the step of:
  giving the respective primary component as a uniform probability distribution and/or a non-uniform probability distribution in response to the at least one primary component input.

7. The converter system for multi-component systems according to claim 1, wherein comparing the primary target multi-component system with at least one target multi-component system comprises calculating a Euclidean distance between the primary target multi-component system and each of the at least one target multi-component systems, and
  wherein the selected at least one target multi-component system being the best fit to the primary target multi-component system is the at least one target multi-component system having the shortest Euclidean distance to the primary target multi-component system.

8. A computer-implemented converter method for multi-component systems, comprising:
  a) outputting, by an input/output unit, at least one primary component prompt of a plurality of primary component prompts,
  b) receiving, by the input/output unit, at least one primary component input in response to the at least one primary component prompt;
  c) for each primary component given as a probability distribution, updating, by an adjustment unit, the probability distribution of the respective primary component in response to the at least one primary component input;
  d) evaluating, by a certainty evaluation unit, a certainty parameter indicative of an entropy of the primary multi-component system;
  e) comparing, by the certainty evaluation unit, the certainty parameter of the primary multi-component system with a certainty threshold,
  wherein the method, if the certainty parameter of the primary multi-component system does not meet the certainty threshold, further comprises performing the steps of:
  f) determining, by a prompt selection unit, a certainty parameter change score for each of the plurality of primary component prompts;
  g) selecting, by the prompt selection unit, a further primary component prompt of the plurality of primary component prompts having a highest certainty parameter change score;
  h) performing steps a) to e) on the basis of the further primary component prompt, if the highest certainty parameter change score has a value greater than a change score threshold;
  wherein the method, if the certainty parameter of the primary multi-component system at least meets the certainty threshold, further comprises performing the steps of:
  i) generating, by a converter unit, a primary target multi-component system having at least one primary target component by mapping at least one primary component to at least one primary target component;
  j) comparing, by a comparison unit, the primary target multi-component system with at least one target multi-component system of a plurality of target multi-component systems; and
  k) selecting, by a selection unit, at least one target multi-component system, wherein the selected at least one target multi-component system is a best fit to the primary target multi-component system.

9. The computer-implemented converter method according to claim 8, wherein each primary component prompt is an input request, and, optionally, wherein the plurality of primary component prompts is a predetermined list of input requests.

10. The computer-implemented converter method according to claim 9, wherein evaluating the certainty parameter further comprises determining a component certainty parameter for each primary component on the basis of the probability distribution of the respective primary component, and determining the certainty parameter on the basis of the component certainty parameters, and, optionally, wherein the determining the certainty parameter comprises calculating the arithmetic mean of the component certainty parameters; and/or wherein the method further comprises performing steps i) to k), if the certainty parameter does not meet the certainty parameter threshold and if the highest certainty parameter change score has a value not greater than the change score threshold.

11. The computer-implemented converter method according to claim 10, wherein the mapping at least one primary component to at least one primary target component comprises using at least one conditional probability table.

12. The computer-implemented converter method according to claim 11, wherein the method further comprises the step of:
  for each primary component not given as a probability distribution, giving, by the adjustment unit, the respective primary component as a uniform probability distribution and/or a non-uniform probability distribution in response to the at least one primary component input.

13. The computer-implemented converter method according to claim 12, wherein comparing the primary target multi-component system with at least one target multi-component system comprises calculating a Euclidean distance between the primary target multi-component system and each of the at least one target multi-component systems, and
  wherein the selected at least one target multi-component system being the best fit to the primary target multi-component system is the at least one target multi-component system having the shortest Euclidean distance to the primary target multi-component system.

14. A non-transitory storage medium containing computer-readable instructions that, when executed by a computer, cause the computer to:
   a) output, by an input/output unit, at least one primary component prompt of a plurality of primary component prompts,
   b) receive, by the input/output unit, at least one primary component input in response to the at least one primary component prompt;
   c) for each primary component given as a probability distribution, update, by an adjustment unit, the probability distribution of the respective primary component in response to the at least one primary component input;
   d) evaluate, by a certainty evaluation unit, a certainty parameter indicative of an entropy of the primary multi-component system;
   e) compare, by the certainty evaluation unit, the certainty parameter of the primary multi-component system with a certainty threshold,
   wherein the method, if the certainty parameter of the primary multi-component system does not meet the certainty threshold, further comprises performing the steps of:
   f) determine, by a prompt selection unit, a certainty parameter change score for each of the plurality of primary component prompts;
   g) select, by the prompt selection unit, a further primary component prompt of the plurality of primary component prompts having a highest certainty parameter change score;
   h) perform steps a) to e) on the basis of the further primary component prompt, if the highest certainty parameter change score has a value greater than a change score threshold;
   wherein, if the certainty parameter of the primary multi-component system at least meets the certainty threshold, the computer is further caused to:
   i) generate, by a converter unit, a primary target multi-component system having at least one primary target component by mapping at least one primary component to at least one primary target component;
   j) compare, by a comparison unit, the primary target multi-component system with at least one target multi-component system of a plurality of target multi-component systems; and
   k) select, by a selection unit, at least one target multi-component system, wherein the selected at least one target multi-component system is a best fit to the primary target multi-component system.

15. The non-transitory storage medium containing computer-readable instructions according to claim 14, wherein each primary component prompt is an input request, and, optionally, wherein the plurality of primary component prompts is a predetermined list of input requests.

16. The non-transitory storage medium containing computer-readable instructions according to claim 15, wherein evaluating the certainty parameter further comprises determining a component certainty parameter for each primary component on the basis of the probability distribution of the respective primary component, and determining the certainty parameter on the basis of the component certainty parameters, and, optionally, wherein the determining the certainty parameter comprises calculating the arithmetic mean of the component certainty parameters; and/or wherein the method further comprises performing steps i) to k), if the certainty parameter does not meet the certainty parameter threshold and if the highest certainty parameter change score has a value not greater than the change score threshold.

17. The non-transitory storage medium containing computer-readable instructions according to claim 16, wherein the mapping at least one primary component to at least one primary target component comprises using at least one conditional probability table.

18. The non-transitory storage medium containing computer-readable instructions according to claim 17 that, when executed by a computer, cause the computer to:
   for each primary component not given as a probability distribution, giving, by the adjustment unit, the respective primary component as a uniform probability distribution and/or a non-uniform probability distribution in response to the at least one primary component input.

19. The non-transitory storage medium containing computer-readable instructions according to claim 18, wherein comparing the primary target multi-component system with at least one target multi-component system comprises calculating a Euclidean distance between the primary target multi-component system and each of the at least one target multi-component systems, and
   wherein the selected at least one target multi-component system being the best fit to the primary target multi-component system is the at least one target multi-component system having the shortest Euclidean distance to the primary target multi-component system.

* * * * *